UNITED STATES PATENT OFFICE.

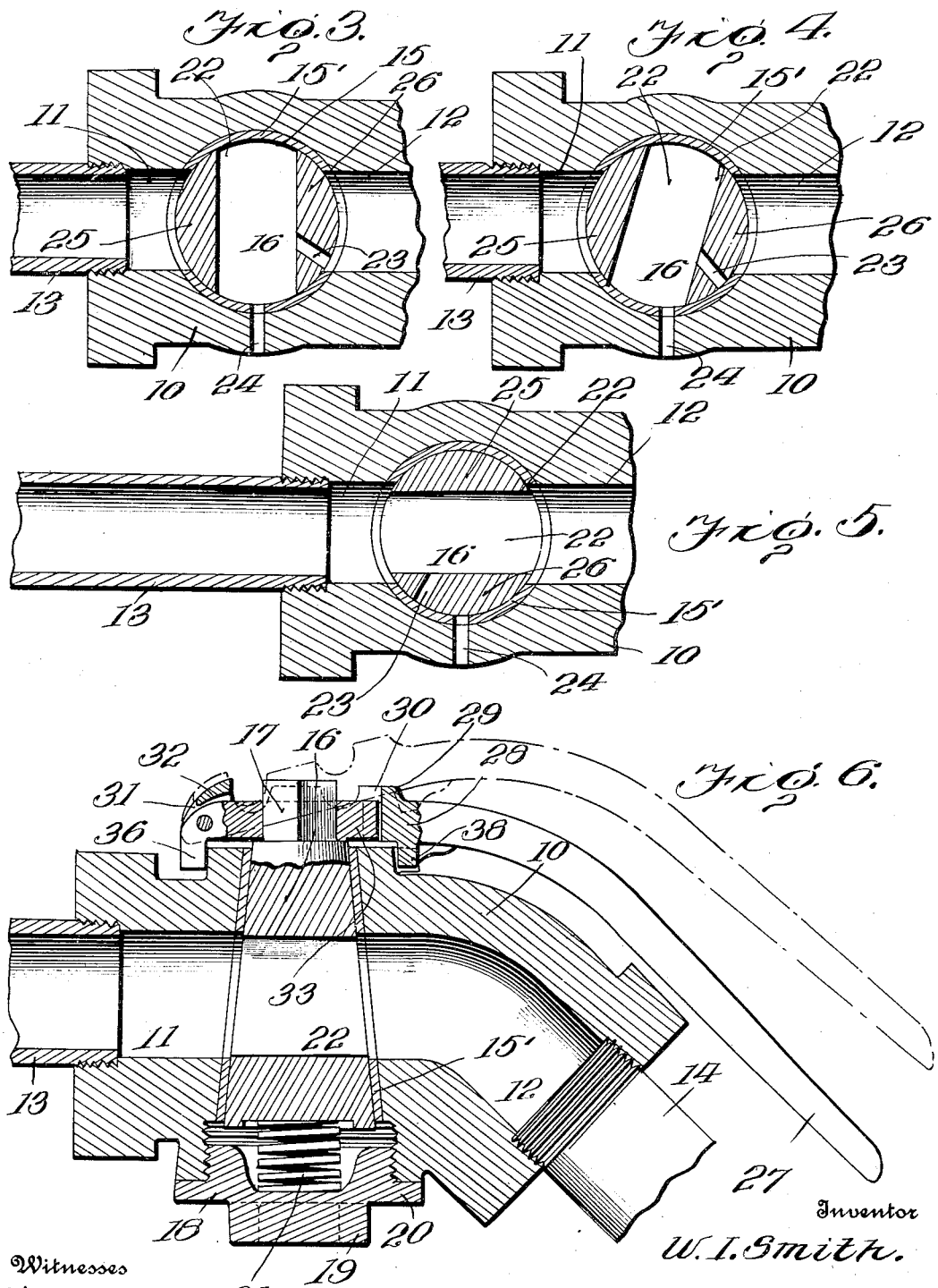

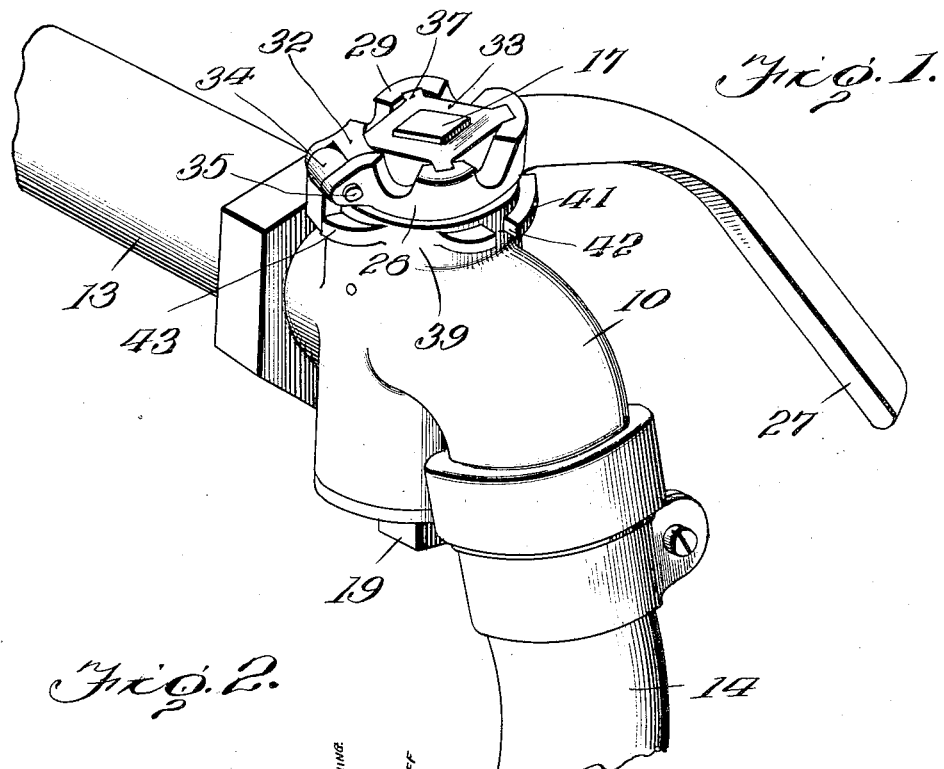
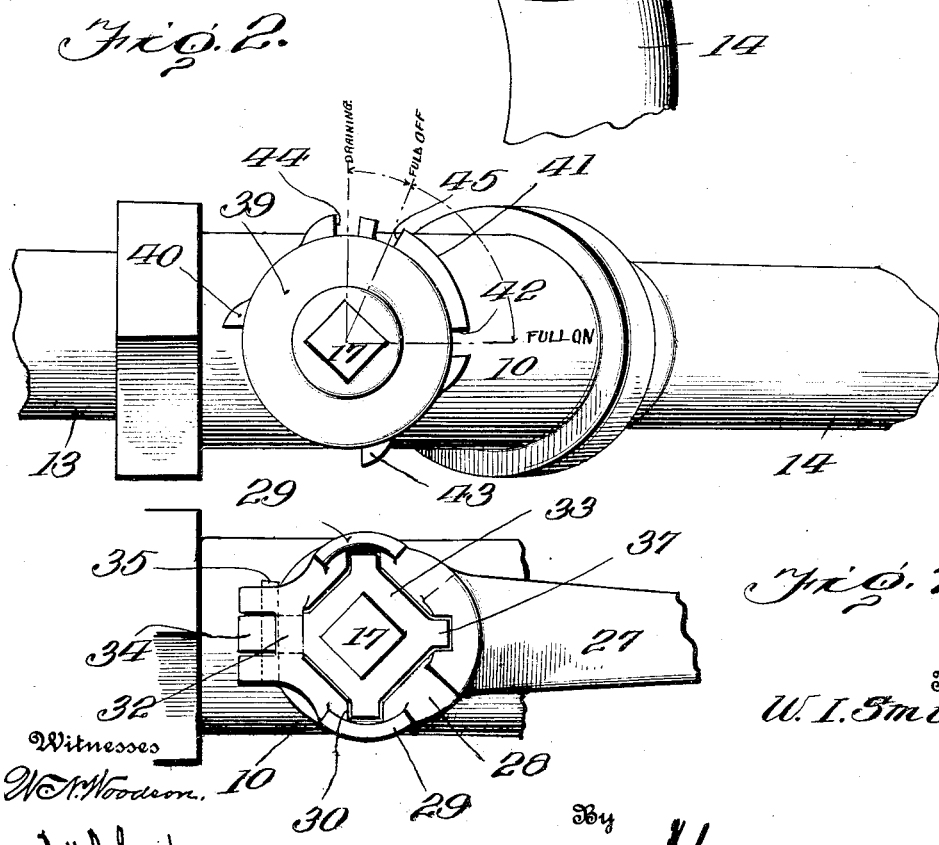

WILLIAM I. SMITH, OF OIL CITY, PENNSYLVANIA.

ANGLE-COCK.

1,177,968.   Specification of Letters Patent.   Patented Apr. 4, 1916.

Application filed December 3, 1914. Serial No. 875,320.

*To all whom it may concern:*

Be it known that I, WILLIAM I. SMITH, a citizen of the United States, residing at Oil City, in the county of Venango and State of Pennsylvania, have invented certain new and useful Improvements in Angle-Cocks, of which the following is a specification.

This invention contemplates an improved angle cock especially adapted for use in connection with air brake systems, being designed for terminal connection with a rigid service pipe and adapted to carry a terminal flexible hose, as will be readily understood.

As is well known, the brake system of one railway coach is operatively connected with the brake system of an adjacent coach through the medium of terminal flexible hose lengths communicating with the service pipes of said coaches and the present invention has as its primary object to provide an angle cock so constructed as to be adapted to drain the air from the said hose lengths after the supply of air from the service pipes has been shut off thereby to consequently relieve the air pressure within the said hose lengths so that they may be readily detached from each other.

The invention has as a further object to provide an improved cock so constructed as to be adapted to permit the unobstructed flow of air from the service pipe therethrough and which, in connection with the arrangement whereby it is disposed to drain air under pressure from the hose connected thereto, will also be adapted to entirely shut off the flow of air both from the service pipe and from the hose, so that air within the hose and flowing from an adjacent hose or system, the cock of which has not been shut off, will not be allowed to escape therefrom.

A consideration of the above stated objects will disclose that the present invention seeks to provide a construction wherein the plug of the cock will be movable to one position to permit an unobstructed flow of air therethrough, to another position to cut off the flow of air from the service pipe and to at the same time drain air from the hose connected with the cock, and to a third position to entirely shut off the flow of air both from the service pipe and from the hose and in this connection, the invention has as a further object to provide an operating handle for the plug, so constructed and arranged that the said plug may be locked in each of the positions indicated and wherein the said handle can seat upon the cock in normal position only when the plug occupies some one of the positions stated.

Other and incidental objects will appear as the description proceeds and in the drawings, wherein I have illustrated the preferred embodiment of my invention and wherein similar reference characters designate corresponding parts throughout the several views—

Figure 1 is a perspective view of my improved angle cock mounted in the usual manner upon a service pipe, Fig. 2 is a top plan view of the cock particularly illustrating the arrangement of the lugs formed thereon which provide retaining notches or shoulders disposed to coact with the operating handle, the operating handle not being shown, Fig. 3 is a section through the pipe showing the plug thereof moved to position to drain the hose connected with the cock Fig. 4 is a similar view illustrating the plug moved to position to entirely shut off the flow of air both from the service pipe and from the hose, Fig. 5 is a view similar to Figs. 3 and 4, and illustrating the plug moved to position to permit the unobstructed flow of air through the cock, Fig. 6 is a vertical section particularly illustrating the construction and mounting of the operating handle, and Fig. 7 is a top plan view partly broken away and also more particularly illustrating the construction of the operating handle.

Coming now to more particularly describe the invention, my improved cock includes a body or casing 10 provided with an inlet port 11 and an outlet port 12 extending at an angle to the port 11. The outer extremity of the port 11 is internally screw threaded to detachably engage the threads of the service pipe conventionally shown at 13 in the usual manner, while the outer extremity of the port 12 is similarly screw-threaded to detachably receive, in the usual manner, one extremity of a hose conventionally shown at 14, the opposite extremity of which is provided with the usual hose coupling as commonly employed in connection with air brake systems, it, of course, being understood that the free extremity of one hose is disposed for detachable connection with the free extremity of an adjacent hose.

The body 10, medially thereof, is formed with a vertically extending substantially conical valve seat or chamber 15 provided with a preferably brass lining 15′ and in which is removably fitted to turn about its vertical axis, a longitudinally tapered plug or valve 16, the upper smaller extremity of which is disposed to project through the body 10 to extend upon one side thereof and is provided with a reduced longitudinally extending head or stem 17 which is squared. Formed in the body 10 upon one side thereof and communicating with the valve seat 15, is an internally screw-threaded bore disposed to detachably receive the externally screw threaded cap 18.

The cap 18 is preferably formed with a squared head 19 and intermediate its length is provided with an annular laterally extending flange 20 disposed to seat upon the body 10. Upon its inner face, the cap 18 is recessed to loosely receive one extremity of a helical spring 21, the opposite extremity of which is disposed to operatively engage the adjacent extremity of the plug 16, the adjacent end of the said plug being also preferably recessed, as best shown in Fig. 6 of the drawings to receive said spring. It will be observed that when the cap 18 is applied, the spring 21 will operatively engage the plug to maintain the said plug in engagement within its seat.

Formed in the plug 16 midway its ends, is a diametrically extending passage 22 disposed to establish uninterrupted communication between the ports 11 and 12, and communicating with said passage is a drain passage 23, formed in one side wall of the passage 22 and extending therethrough, the passage 23 being disposed to establish communication between the passage 22 and the outlet port 12. It will be noted that the passage 23 is arranged adjacent one side edge of the wall in which it is formed and enters through said wall at an angle oblique to the axis of the plug 16, this being for a reason which will presently appear.

Formed in one side wall of the body 10 and communicating with the valve chamber 15 is a waste passage 24, this passage and the drain passage being disposed in horizontal planes with the passage 24 arranged above the said last mentioned passage so that at no time will the said passages register. Particular attention is now directed to Figs. 3, 4, and 5 of the drawings wherein I have illustrated the manner in which the passages 23 and 24 are disposed to coact with the port 12, the valve chamber 15, and the passage 22, to effect certain of the objects of the present invention.

Particularly considering Fig. 3, it will be observed that when the plug 16 is moved to the position therein shown, in a manner which shall be presently described, one wall 25 of the passage 22 will entirely close the inlet port 11, to shut off the flow of air through the service pipe 13, while the passage 23 is disposed to establish communication between the outlet port 12 and the passage 22, which in turn is in communication with the valve chamber 15. Under such conditions, the waste passage 24 will also then communicate with the passage 22 as therein shown. Assuming now that the hose 14 connected with the outlet passage 12 is under air pressure from the service pipes 13, it will be seen that air within the said hose will readily flow back through the outlet port 12, through the drain passage 23 into the passage 22 and into the valve chamber 15 to be thence discharged through the waste passage 24. Consequently, in the position of the plug 16 shown in this figure, the cock will entirely shut off the flow of air through the service pipe and will drain air under pressure from the hose 14.

At this time, it is desired to bring particular attention to this feature of the invention since, in the uncoupling of railway rolling stock, many advantages are attendant thereon. In the type of cock as now commonly employed in this connection, it is only possible to simply cut off the flow of air from the service pipe while the hose connected to the cock remains under air pressure. Consequently, adjacent hose couplings must be detached under the influence of said air pressure which not only renders such operation quite difficult, but very often results in injury to the gaskets carried by said couplings. Furthermore, the length of flexible hose connected to each of the cocks of adjacent cars being often subjected to an air pressure ranging from seventy to one hundred pounds per square inch, will, upon being detached from each other often be flexed with considerable force and violence under the influence of such air pressure as it escapes from the hose to cause serious injury to the person effecting the uncoupling operation of the said hose. In the construction which I provide, it will be seen that these various disadvantages are effectually overcome.

To now consider the position of the plug shown in Fig. 4, it will be observed that the wall 25 thereof is disposed to close the inlet passage 11 to shut off the flow of air from the service pipe 13, while the drain passage 23 is moved to such position as to be entirely closed by the adjacent wall of the valve chamber 15, the wall 26 of the passage 22 then entirely closing the outlet port 12 to shut off any return flow of air therethrough, coming from the hose 14. The reason for arranging the passage 23 adjacent one side edge of the said wall and oblique to the plug 16, is now apparent, since in the position of the plug shown in this figure, the passage is thereby disposed in such position as to be entirely closed by the wall of the valve chamber 15. Assuming the cock carried by the system of an adjacent car to be standing in open position or permitting free flow of air therethrough from the service pipe, it will be seen that when the plug 16 is thus disposed as shown in this figure, such flow of air entering through a coacting hose 14, will not be permitted to escape as would otherwise be the case were the plug to be permitted to stand in the position shown in Fig. 3. In this connection, it should be stated that when the plug 16 is moved in position to drain the hose 14 as shown in Fig. 3, the plug associated with a coacting hose will be moved to a similar position.

In Fig. 5 of the drawings, the plug is shown moved to position to permit the unobstructed flow of air from the service pipe 13 through the inlet port 11 through the passage 22 and through the outlet port 12, it being observed that the waste passage 24 is, in such position of the plug, closed by the wall 26 thereof, so that air cannot escape through the said passage. In this connection, attention is called to the fact that since the drain passage 23 is disposed above the waste passage 24, the said passages will not be brought into register to permit the momentary discharge of air therethrough when the plug is shifted to or from the position shown in this figure.

It will thus be seen that I provide an improved cock wherein the valve thereof is adjustable to the three operative positions stated for effectually accomplishing the attendant objects previously set forth, first, to entirely shut off the flow of air from the service pipe and any return flow of air from the hose connected to the cock; second, to shut off the flow of air from the service pipe and permit a return flow of air to drain the hose; and third, to permit an unobstructed flow of air through the cock.

In connection with the construction and arrangement of valve shown, I provide an improved operating handle therefor, disposed to coact with the plug for selectively locking it in any one of the positions stated and so constructed that the said handle will be permitted to seat in normal position only when the valve occupies some one of the positions stated. The handle is indicated at 27 in the drawings, the said handle being longitudinally curved to conform substantially to the angularity of the body 10 at the adjacent end thereof and being provided with a terminal head 28.

As best shown in Figs. 1 and 6 of the drawings, the head 28 is provided with a plurality of upstanding lugs 29 in the confronting faces of which are formed vertically arranged slots 30. At the forward extremity thereof opposite the adjacent extremity of the handle 27, the head 28 is provided with a pair of laterally extending and oppositely disposed ears 31 which are joined at their upper extremities by a transversely extending web 32.

The head 28 is centrally cut away to receive a yoke 33 upon one side of which is provided a laterally extending arm 34 projecting between the ears 31 beneath the web 32, the arm 34 being pivotally connected to said ears by a suitable pivot pin 35.

Formed on the arm 34 at the outer extremity thereof, is a downwardly extending lug or stop 36, the said stop being arranged in a plane substantially at right angles to the plane of the yoke 33. It will be observed that the yoke 33 is pivotally mounted upon the head and is provided with a plurality of laterally projecting guide lugs 37 which are loosely received within the slots 30. Formed on the head 28 upon one side thereof and arranged diametrically opposite the stop 36, is a downwardly extending stop or shoulder 38.

The yoke 33 is centrally apertured to detachably receive the squared head 17 of the plug 16 and the handle is thus operatively connected with the plug by the said yoke, it being observed that the handle may be moved in a vertical plane upon the yoke upon the pivot pin 35, while in normal position it will be supported by the web 32 which is disposed to bear against the arm 34. Formed on the body 10 upon one side thereof and disposed for engagement with the stops 36 and 38, is a plurality of co-acting shoulders and notches. Upon the upper extremity of the cylindrical portion 39 of the body and upon one side thereof, is provided a radially projecting shoulder 40. The cylindrical portion 39 upon its opposite side is provided with a circumferentially extending flange 41, which, diametrically opposite the shoulder 40, substantially, is provided with a notch 42. Arranged at substantially right angles to the plane of the shoulder 40, the portion 39 is further provided with a shoulder 43 similar to the shoulder 40 and substantially diametrically opposite the shoulder 43, the flange 41 is provided with a notch 44, a notch 45 also being formed in the said flange adjacent the notch 44 and between said last mentioned notch and the notch 42.

As will be seen upon particular reference to Fig. 1 of the drawings, the shoulders 40 and 43 are arranged in the path of the stop 36 when the handle is moved to turn the plug 16 within the cock, while the stop 38 is normally disposed to seat in one of the notches 42, 44, or 45. It will further be observed upon particular reference to Fig. 2 of the drawings, that the shoulder 40 and notch 42 are arranged in a plane with the inlet and outlet ports 11 and 12, so that when the handle is turned into alinement with the cock, the stop 36 will engage the shoulder 40 while the stop 38 will seat within the notch 42 with the passage 22 of the plug 16 turned to the position shown in Fig. 6 of the drawings or what will be termed "full on." However, in this connection, it will be seen that in order to thus turn the plug, the handle 27 must first be moved in a vertical plane upon its pivot to a position where the stop 38 will clear the flange 41 and particular attention is called to the fact that owing to the presence of the said flange, the handle can seat in normal position only when the stop 38 is engaged within some one of the notches 42, 44 or 45. Consequently, a visible means is provided by which it may be readily determined whether or not the plug 16 is properly adjusted to any one of its three operative positions previously set forth and accordingly, the possibility of allowing the plug to stand at any intermediate point is reduced to a minimum. It will also be noted upon particular reference to Fig. 2 of the drawings that the shoulder 43 and notch 44 are arranged at substantially right angles to the plane of the inlet and outlet ports 11 and 12 respectively, so that when the handle is moved to turn the plug 16 with the stop 36 engaging the shoulder 43 and with the stop 38 engaging within the notch 44, the plug will be moved correspondingly to assume its normal draining position as shown in Fig. 3 of the drawings, or, in other words, to such position that the air will drain from the hose 14. It will now be observed that in the provision of the stop 36 and the arrangement of shoulders 40 and 43, it will be impossible to turn the plug 16 in one direction to a position beyond the full on position of the plug or to turn the said plug in the opposite direction to a position beyond the draining position of the plug.

The notch 45 is so disposed circumferentially of the flange 41 that when the stop 38 is engaged therein, the plug 16 will then be moved to full off position as shown in Fig. 4 of the drawings, or more specifically, to such position where communication will be entirely shut off between the inlet and outlet ports. It will thus be seen that I provide an arrangement wherein the radius of turning movement of the plug within the cock is limited in reverse directions between points wherein it will occupy a full on position or wherein it will occupy draining position, and that the said plug may be locked in any one of its three operative positions heretofore set forth.

What is claimed as new is:—

1. An angle cock including a body having inlet and outlet ports and provided with a valve chamber, said body having a waste passage formed therein communicating with the valve chamber, a valve mounted to turn within the valve chamber and having a passage formed therein disposed to establish communication between the inlet and outlet ports and adapted to have communication with said waste passage, said valve having a drain passage formed therein communicating with its first mentioned passage, the valve being movable to one position to entirely shut off communication between the inlet and outlet ports and to at the same time close the drain passage, to another position to establish communication between the inlet and outlet ports and to at the same time close the drain passage and the waste passage and to a third position to close the inlet passage with the drain passage communicating both with the outlet port and with the valve passage, and with the valve chamber communicating with the waste passage, and means associated with the valve and operatively coöperating with the body for selectively locking the valve in any one of said positions.

2. The combination with an angle cock including a body having inlet and outlet ports and provided with a valve chamber, a waste passage communicating with the valve chamber, a valve mounted to turn in said chamber and having a passage formed therein adapted to communicate with the waste passage and disposed to establish communication between the inlet and outlet ports, said valve being provided with a drain passage communicating with its first mentioned passage, of an operating handle carried by the valve and operatively coöperating with the body for selectively locking the valve in full on position, in full off position and in position to drain the outlet port.

3. The combination with an angle cock having a valve movable to full on position, to full off position, and to draining position, of an operating handle for the valve, said handle including a yoke pivotally connected therewith and engaging the valve, coacting stops carried by the handle, and shoulders carried by the cock, said cock having a plurality of notches formed therein, certain of said notches coacting with said shoulders, the handle being movable to selectively engage the stops carried thereby with said coacting shoulders and notches for locking the valve in certain of said positions and to engage one of the stops carried thereby with another of said notches for locking the valve in another of said positions.

4. The combination with an angle cock having a valve movable to full on position, to full off position and to draining position, of an operating handle for the valve, said handle including a yoke pivotally connected therewith and engaging the valve, the handle being movable in a vertical plane upon the yoke, a web carried by the handle and disposed to engage the yoke for limiting the handle in its movement in one direction to operative position, coacting stops carried by the handle, shoulders carried by the cock and disposed in the path of one of said stops, and a flange formed on the cock and disposed in the path of the other of said stops, said flange having a plurality of notches formed therein, certain of said notches coacting with said shoulders, the handle being movable to selectively engage the stops carried thereby with said coacting notches and shoulders for locking the valve in certain of said positions and to engage one of the stops carried thereby in another of said notches for locking the valve in another of said positions.

5. The combination with an angle cock having a valve movable to full on position, to full off position, and to draining position, of an operating handle for the valve, said handle including a yoke pivotally connected therewith and engaging the valve, the handle being movable in a vertical plane upon the yoke, coacting stops carried by the handle, shoulders formed on the cock and disposed for engagement with one of said stops, and a flange formed on the cock and disposed in the vertical path of the other of said stops, the said flange being disposed to support the handle in elevated inoperative position and having a plurality of notches formed therein, certain of said notches coacting with said shoulders, the handle being movable to selectively engage the stops carried thereby with said coacting notches and shoulders for locking the handle in operative position in certain of said positions of the valve and to engage one of the stops carried thereby in another of said notches with the handle in operative position for locking the valve in another of its said positions.

6. The combination with an angle cock having a valve movable to full on position, to full off position, and to draining position, of an operating handle for the valve, and coacting means carried by the handle and the valve respectively for positively locking the valve in each of said positions.

7. The combination with an angle cock having a valve movable to full on position, to full off position, and to draining position, of an operating handle for the valve swingingly connected therewith, and coacting means carried by the valve and the handle respectively for locking the valve in each of said positions, the handle being movable to normal position only when the valve is moved to assume some one of the designated positions thereof.

8. The combination with an angle cock having a valve movable to full on position, to full off position, and to draining position, of an operating handle for the valve swingingly connected therewith, and coacting means carried by the valve and the handle respectively for locking the valve in each of said positions, the said means being adapted to support the handle in operative position in the inoperative position of said valve.

9. The combination with an angle cock having a valve movable to full on position, to full off position, and to draining position, of an operating handle for the valve swingingly connected therewith, and coacting means carried by the valve and the handle respectively for locking the valve in each of said positions, said means including a flange adapted to support the handle in inoperative position in the inoperative position of the valve.

In testimony whereof I affix my signature in presence of two witnesses.

WILLIAM I. SMITH. [L. S.]

Witnesses:
ALPHONSE J. FLECKENSTEIN,
JOHN L. MATTOX.